(12) United States Patent
McKeeman et al.

(10) Patent No.: US 9,282,495 B1
(45) Date of Patent: *Mar. 8, 2016

(54) METHOD FOR SWITCHING FROM A FIRST CELLULAR NETWORK TO A SECOND CELLULAR NETWORK

(71) Applicant: Utility Associates, Inc., Tucker, GA (US)

(72) Inventors: Robert S. McKeeman, St. Pete Beach, FL (US); Simon Araya, Atlanta, GA (US); Ted M. Davis, Decatur, GA (US)

(73) Assignee: Utility Associates, Inc., Tucker, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/256,258

(22) Filed: Apr. 18, 2014

Related U.S. Application Data

(63) Continuation of application No. 13/832,517, filed on Mar. 15, 2013, which is a continuation-in-part of application No. 13/594,047, filed on Aug. 24, 2012, now abandoned.

(60) Provisional application No. 61/526,998, filed on Aug. 24, 2011.

(51) Int. Cl.
*H04W 36/00* (2009.01)
*H04W 4/00* (2009.01)
*H04W 36/14* (2009.01)

(52) U.S. Cl.
CPC ............... *H04W 36/14* (2013.01); *H04W 4/00* (2013.01)

(58) Field of Classification Search
CPC . H04W 36/30; H04W 36/14; H04W 36/0083; H04W 24/08; H04W 4/021; H04W 16/18; H04W 36/32; H04W 4/00
USPC ........ 455/436–439, 443, 456.1; 370/331, 332
See application file for complete search history.

(56) References Cited

U.S. PATENT DOCUMENTS

| | | | |
|---|---|---|---|
| 6,466,556 B1 | 10/2002 | Boudreaux | |
| 7,720,488 B2 | 5/2010 | Feher | |
| 7,987,449 B1 | 7/2011 | Marolia et al. | |
| 7,987,471 B2 | 7/2011 | Herzog et al. | |
| 2005/0047368 A1 | 3/2005 | Kotzin et al. | |
| 2008/0025263 A1 | 1/2008 | Pelkonen | |
| 2009/0052399 A1 | 2/2009 | Silver et al. | |
| 2010/0220943 A1 | 9/2010 | Mikami et al. | |
| 2011/0189997 A1 | 8/2011 | Tiwari et al. | |
| 2011/0255516 A1 | 10/2011 | Pawar et al. | |
| 2012/0046040 A1 | 2/2012 | Chatterjee | |
| 2012/0184276 A1 | 7/2012 | Pichna et al. | |

*Primary Examiner* — Nizar Sivji
(74) *Attorney, Agent, or Firm* — Smith Gambrell & Russell LLP

(57) ABSTRACT

This invention provides a system and a method to automatically switch cellular data communications from 3G to 4G mode wherever reliable 4G cellular connectivity is available, and to collect and report reliable 4G cellular coverage geofence polygon information. The invention also provides a system and method to automatically switch cellular data communications between 4G cellular networks provided by different carriers, and 3G cellular networks provided by different carriers.

27 Claims, 10 Drawing Sheets

METHOD FOR SWITCHING FROM A FIRST CELLULAR NETWORK TO A SECOND CELLULAR NETWORK

CLAIM OF PRIORITY

This application is a continuation of U.S. patent application Ser. No. 13/832,517, filed on Mar. 15, 2013, currently pending, which is a continuation in part of U.S. patent application Ser. No. 13/594,047, filed on Aug. 24, 2012, which claims priority to U.S. Provisional Patent Application No. 61/526,998 filed on Aug. 24, 2011, each of which are relied upon and incorporated herein in its entirety by reference.

BACKGROUND OF THE INVENTION

1. Technical Field

The present invention is in the technical field of cellular data communications. More particularly, the present invention is in the technical field of managing the switching of wireless communication devices from a cellular data communications of a lower speed to a cellular data communications of a faster speed upon entering into the area of the faster speed cellular data communications.

2. Related Art

The wireless cellular industry is continuously upgrading their cellular data networks to improve their speed and increase the amount of data that is transmitted. Currently, wireless cellular providers are updating their networks from third generation (3G) cellular data communications to fourth generation (4G) cellular data communications. 4G cellular data communications provides upload and download bandwidth that is multiple times faster than 3G. Accordingly, cellular data users want to have their networking hardware operate in 4G mode if 4G mode is available at their current physical location.

Typically, the networking hardware of the cellular data user, such as, but not limited to, a 3G/4G capable modem found in a laptop, wireless router, or other wireless communication device, is used in a stationary manner, such as in an office, conference room, or the home of the user. If the networking hardware is within range of 4G cellular coverage upon activation, the networking hardware will utilize the 4G cellular communications. If there is no 4G cellular coverage at the location, and networking hardware is within the range of a 3G cellular network, the networking hardware will connect to the 3G cellular network. Such operation is fine when the networking hardware remains stationary or the user shuts down the networking hardware before moving from a 3G cellular network service area to a 4G cellular network service area and restarts a cellular data communication sessions as part of the move. Otherwise, the user will receive an error message via the networking hardware that the cellular data connection has been lost, and the user will manually restart the cellular communications connection using the vendor's cellular modem management software application associated with the networking hardware. The networking hardware cellular modem upon initial connection startup will connect to 4G service if it is available, then 3G service if 4G is not available, and then 2G service if 4G and 3G are not available.

However, there is a non-stationary use case of a 3G/4G cellular modem in a networking hardware—where the networking hardware is found within a vehicle in motion and therefore dynamically traveling in and out of 3G and 4G mode cellular coverage areas. For example, first responders (e.g., police, fire fighters, EMS, etc.), utility workers (e.g. gas, electrical, communications, water, etc.) and other industries that require workers or employees to work from a vehicle need to have a reliable and efficient communications connection back to their respective headquarters/dispatchers/information service providers. In such instances, the vehicle driver is not able to safely monitor and maintain the cellular data connection due to the vehicle driver having to drive the vehicle in addition to performing business-defined duties. Therefore, the networking hardware needs to autonomously manage the switching of cellular data communications between 3G and 4G mode as the vehicle travels about in and out of 3G and 4G cellular coverage areas in order to maintain the needed data connection.

Dual mode 3G/4G cellular modems partially address this problem. If a vehicle's networking hardware with a dual mode 3G/4G cellular modem is initially activated within a wireless access point offering 4G mode, the networking hardware will continue to operate in 4G mode until the vehicle travels outside of the 4G coverage area. Once out of the 4G coverage area, the networking hardware will lose or drop the 4G cellular data connection. If the networking hardware can no longer communicate with 4G cellular data towers, and the connection drops, the networking hardware will then automatically connect to 3G cellular coverage. This inherent assumption only is fulfilled if the 3G cellular coverage is available.

However, dual mode 3G/4G cellular modems cannot instantly detect when a vehicle has traveled from a 3G cellular coverage area back into a 4G cellular coverage area. 3G networks and 4G networks operate at different frequencies (i.e., 840/1900 MHz for 3G and 700 MHz for 4G). Since dual mode 3G/4G cellular modems can only operate at one frequency at a time, thereby only being connected to one cellular network at a time, the dual mode 3G/4G cellular modem is unable to monitor and connect to both the 3G and 4G networks simultaneously. Once networking hardware is actively communicating on a 3G cellular network, it is actively transmitting data and therefore cannot scan for other frequencies such as 4G networks. When the networking hardware enters into a "quiet time", a period of not transmitting data, the networking hardware can scan for other networks. However, if actively communicating in a 3G network, the networking hardware will continue to operate in 3G mode regardless of whether a vehicle drives back into a 4G cellular coverage area. Quiet periods are few and far between for networking hardware that is employed for public safety purposes, wherein the wireless device is constantly sending and receiving critical information, such as GPS position and computer aided dispatch data, as well as other data types. In addition, these wireless devices communicate "heartbeat" and socket "keep alive" messages. So a 3G/4G networking hardware operating in 3G mode has limited ability to determine that 4G cellular coverage might be available where the vehicle is now located—either stopped or in motion as the vehicle continues to travel. As such, the networking hardware often remains connected to the cellular data communications in slower 3G mode even if the vehicle and the networking hardware have traveled into a reliable 4G cellular coverage area.

As a result, a system and method is needed to determine when a vehicle—and therefore the vehicle networking hardware installed or contained in the vehicle—has traveled into a reliable 4G cellular coverage area while still connected to a 3G cellular network. If the networking hardware has traveled into a 4G coverage area, the networking hardware must somehow determine it is now located in a reliable 4G cellular data coverage area. Once the networking hardware determines that it is in a known reliable 4G cellular coverage area, the networking hardware can then disconnect from the 3G cellular coverage and connect to the 4G cellular coverage, regardless of whether the modem itself knows the vehicle has traveled into a reliable 4G service area. Further, the networking hardware needs to manage this 3G to 4G switching process automatically as a vehicle drives in and out of 3G and 4G cellular coverage areas.

In addition, there is a need for a system and method to determine the availability and reliability of 4G cellular coverage at any given location. A system and method is needed to continuously collect information about the actual current reliable 3G and 4G cellular coverage areas, and make that information available on a shared basis to other networking hardware in other vehicles so that any related networking hardware has the maximum ability to operate in the much higher bandwidth that 4G cellular data communications provides.

SUMMARY OF INVENTION

The present invention is a system and method for switching a wireless communication device in a vehicle to the most reliable cellular communications within a cellular network coverage area.

One embodiment of the present invention manages the switching of the wireless communication device from a 3G cellular communications to a 4G cellular communications by monitoring active connections of the wireless communication device, reviewing the reliability information of the networks associated with the geo-fence polygon that corresponds to the location of the wireless communication device, and directing the wireless communication device to connect to the proper network.

One embodiment of the present invention can optionally capture and report drops and discoveries of reliable 3G and 4G coverage records with date, time, GPS location coordinates, signal quality, service area polygon/grid cell ID, and other data elements when coverage is determined to be available in a geo-fence polygon. Additional embodiments may update and/or create geo-fence polygon entries based upon the information obtained.

Another embodiment of the present invention includes using the collective 4G coverage discovery and/or drop records collected from wireless communication devices of the enterprise vehicle fleet to a central database of geo-fence polygon entries. The system and method may also aggregate discovery and/or drop records from the wireless communication devices of multiple enterprise vehicle fleets into a central database of discovery and/or drop records, where multiple enterprises can leverage and benefit from discovery and/or drop records captured and reported by wireless communication devices from other enterprise fleets.

Another embodiment of the present invention includes distributing updated 4G discovery and drop geo-fence polygon information from a central database to all the wireless communication devices of the enterprise fleet and/or across multiple enterprise fleets so that all the wireless communication devices for multiple enterprise fleets all have access to the most recent set of reliable 4G geo-fence coverage polygon information as reported by any system wireless communication devices. Another embodiment of the present invention periodically includes distributing reliable 4G geo-fence coverage polygon information from the central database to a local database located on the wireless communication devices. The updated information documenting discoveries, drops, and the reliability of networks may be in the form of updated geo-fence polygon database entries.

Another embodiment of the present invention may include modules operating on the wireless communication devices that interrogate and obtain current GPS location from a GPS module associated with the wireless communication device, and compares the current GPS location of the wireless communication device of the vehicle to a local database of reliable 4G geo-fence coverage polygon information to determine if the vehicle and the wireless communication device are currently located in a reliable 4G coverage polygon.

Another embodiment of the present invention may include a system and method for switching a wireless communication device in a vehicle from 3G or 4G cellular communications provided by a first cellular carrier to another 3G or 4G cellular communications provided by a second cellular carrier when the vehicle enters into a 3G or 4G cellular communications coverage area that is more reliable than the first cellular carriers 3G or 4G cellular communications coverage area that shares the same location.

These and other objects and advantages of the invention will become apparent from the following detailed description of the preferred embodiment of the invention.

Both the foregoing general description and the following detailed description are exemplary and explanatory only and are intended to provide further explanation of the invention as claimed. The accompanying drawings are included to provide a further understanding of the invention and are incorporated in and constitute part of this specification, illustrate several embodiments of the invention, and together with the description serve to explain the principles of the invention.

DETAILED DESCRIPTION OF THE EMBODIMENTS

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
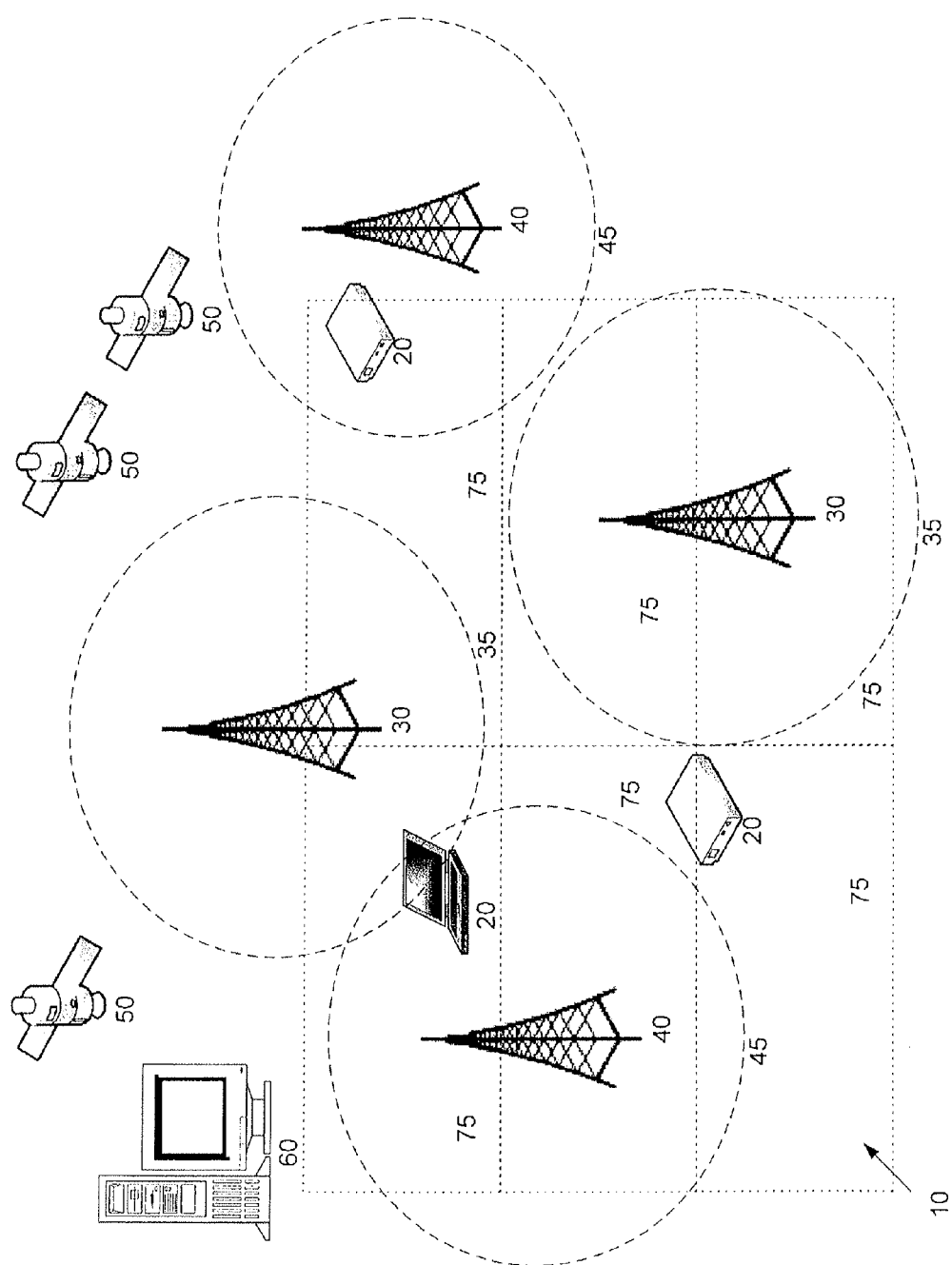
FIG. 1 is a block diagram of an automated cellular network switching system according to an embodiment of the present invention.

Referring to FIG. 1, the present invention is directed to an automated wireless network switching system 10 that automatically identifies and establishes connections for wireless communication devices 20 to a first wireless network 30 and a second wireless network 40 of differing mobile communication standards depending on the current and future locations of wireless communication devices 20 in the coverage areas 35, 45 of such networks 30, 40. In some embodiments of the present invention, the automated cellular network switching system 10 may utilize Global Positioning System (GPS) satellites 50 and a central server 60, which may be able to communicate over and/or through the wireless cellular networks 30, 40 with the wireless communication devices 20, to further enhance the automatic switching of the networks 30, 40 for the wireless communication devices 20 as they move among different coverage areas 35, 45. According to one embodiment, the automated wireless networking system 10 is directed at controlling the switching of wireless communication devices 20 between a first cellular network 30 and second cellular network 40 of differing mobile communication standards (e.g., 3G and 4G). However, in other embodiments, the automated wireless networking system 10 may control the switching between varieties of wireless networks, as discussed below.

Figure 2:
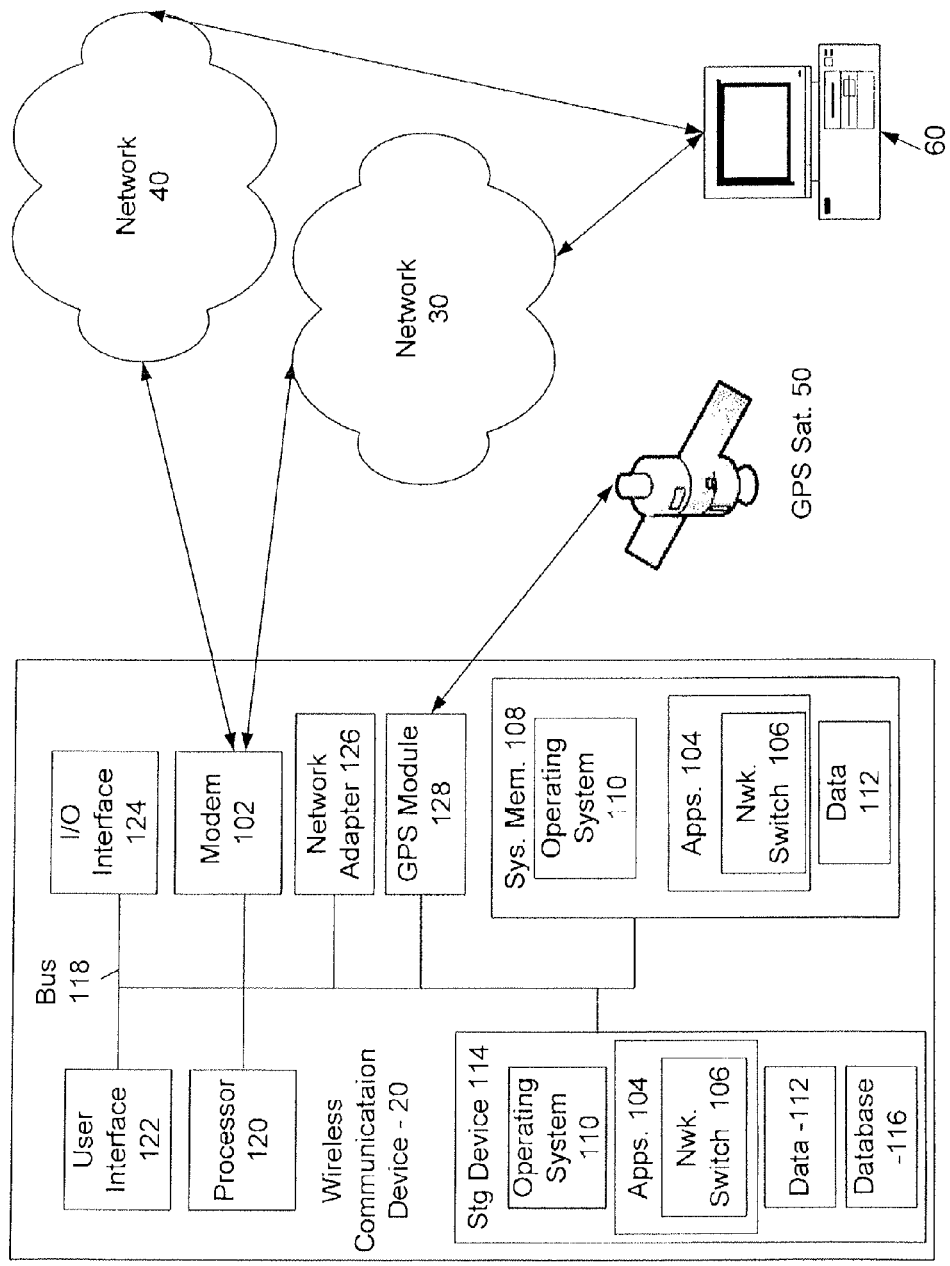
FIG. 2 is a block diagram of a wireless communication device of the automated cellular network switching system of FIG. 1 according to an embodiment of the present invention.

As shown in FIGS. 1-2, the automated wireless network switching system 10 is an automated cellular network switching system 10 that includes at least one wireless communication device 20. Examples of the wireless communication devices 20 utilized by the automated wireless network switching system 10 include, but are not limited to, laptops, wireless routers, wireless vehicle routers (e.g., Utility Associates Rocket, Sierra Wireless GX440, and wireless vehicle routers by InMotion and BlueTree), tablets, smart phones, PDA's, hand held computers, and the like. The only limitation is that the wireless communication device 20 has some means of communicating on multiple generations of cellular networks, including, but not limited to current generations like 3G, 4G networks, and future generations, including the proposed 5G network.

The wireless communication devices 20 include a modem 102. In the preferred embodiment of the present invention, the modem 102 is a cellular modem capable of communicating on 3G and 4G networks. Embodiments of the present invention are not limited to cellular modems 102 only capable of communicating on 3G and 4G networks. The invention encompasses modems 102 capable of communicating on 2G, 3G, 4G, and 5G networks, other communication networks, including satellite networks, as well.

In some embodiments, the invention encompasses modems 102 that are capable of communicating on cellular networks of multiple cellular network carriers. For example, in one example of such an embodiment, the modem 102 can communicate on multiple 4G LTE cellular networks provided by different carriers that operate on different 700 MHz bands (e.g., AT&T and Verizon). In another example of the present embodiment, the modem 102 can operate on multiple 4G cellular networks operating on different frequency bands (e.g., Sprint on 1900 MHz, T-Mobile on 1700 MHz, and AT&T and Verizon on 700 MHz). In another example of the present embodiment, the modem 102 can operate on multiple different 3G and 4G cellular networks of different carriers, as well as on different types of networks (e.g., the FirstNet private Public Safety Broadband Network on a 700 MHz band).

In addition, some modems according to other embodiments of the present invention are directed to communicate on public and private networks. For example, embodiments of the present invention encompass modems capable of communicating on the New York City government private NYCWIN 2.5 Ghz 4G LTE network voice and data network built after 9/11, and the private Public Safety Broadband Network (PSBN) included in the federal law 2012 HR 3630. Switching between public carrier networks and private networks (e.g. PSBN) present similar issues when the private network is unavailable.

The cellular modem 102 may be embedded within the wireless communication device 20 or be self-standing and connected to the wireless communication device 20 through various means, including, but not limited to, a USB connection. Examples of cellular modems include, but are not limited to, AT&T Momentum, Verizon 551 L, USB cellular modems and motherboard mounted cellular chipsets manufactured by Novatel Wireless, Sierra Wireless, Huawei, and the like. In addition, the modem 102 may operate switching between cellular and satellite communications. Such a modem may include, but is not limited to, a Galaxy 1 BGAN terminal.

The modem 102 is configured to automatically connect to a slower network when the faster network is not available. For example, in one embodiment, the cellular modem 102 automatically connects to a 3G cellular network 30 if not within the coverage area 45 of a 4G cellular network 40 upon start up or in the case that a connection to a 4G cellular network 40 is dropped. This occurs as long as the wireless communication device 20 is within a coverage area 35 of a 3G network 30. The modem will attempt 102 to connect to a slower 2G service, such as EDGE/1×RTT, if 3G CDMA/GSM/HSPA and its equivalents are not available. In another embodiment, the modem 102 can automatically connect to a 3G cellular network 30 or 4G cellular network 40 of another provider if the modem 102 enters into another coverage area 35/45 where the current 3G cellular network 30 or 4G cellular network 40 is not available.

The cellular modem 102 is configured to also monitor the reliability of all connections. The reliability of a network can be determined from information collected by the cellular modem 102, which includes, but is not limited to, signal strength, quality, availability, packet loss, retransmits, packet latency, throughput speed, and other cell tower signaling quality factors. The cellular modem 102 will compare this information in various forms to a reliability threshold in order to determine whether or not to maintain or terminate a connection to a cellular network. The reliability threshold is often automatically set by the cellular carrier, or manually set by the user of the wireless communication device 20, and can vary by the numerous factors discussed above.

The cellular modem 102 is configured to establish a connection with cellular networks in which the cellular modem 102 is located. The cellular modem 102 is configured to monitor and detect 3G and 4G cellular networks 30, 40 as the cellular modem 102 moves from one network coverage area 35 to another network coverage area 45 via the vehicle in which it is contained. The cellular modem 102 can detect when a connection to a particular network is made, whether it is a 3G or 4G network 30, 40, as well as which cellular network provider (e.g., Verizon, T-Mobile, etc.) it has connected to. When in a "quiet" period, such as when it is not actively transmitting data or establishing a connection, the cellular modem 102 can scan frequencies to see if a cellular network 30, 40, new or established, is available. The "quiet" periods can occur when the wireless communication device 20 starts up in a grid cell, when a connection drops and the modem 102 does a reconnect, or in instances when it is not actively transmitting data. The cellular modem 102 can determine the signal strength, quality, availability, carrier provider and throughput of the cellular network 30, 40 in which it is located, and report such information to a network switching application 106, discussed below.

In addition to the cellular modem 102, the wireless communication device 20 can have several applications 104, including the network switching application 106. The wireless communication devices 100 include system memory 108, which can store the various applications 104, including, but not limited to, the operating system 110 of the wireless communication device 20 and the network switching application 106. The system memory 108 may also include data 112 accessible by the various software applications. The system memory 108 can include random access memory (RAM) or read only memory (ROM). Data 112 stored on the wireless communication device 20 may be any type of retrievable data. The data may be stored in a wide variety of databases, including relational databases, including, but not limited to, Microsoft Access and SQL Server, MySQL, INGRES, DB2, INFORMIX, Oracle, PostgreSQL, Sybase 11, Linux data storage means, and the like.

The wireless communication device 20 can include a variety of other computer readable media, including a storage device 114. The storage device 114 can be used for storing computer code, computer readable instructions, program modules, various databases and other data for the communication device 20, and the storage device 114 can be used to back up or alternatively to run the operating system 110 and/or other applications 104, including the network switching application 106. The storage device 114 may include a hard disk, various magnetic storage devices such as magnetic cassettes or disks, solid-state flash drives, CD-ROM, DVDs or other optical storage, random access memories, and the like.

Figure 3:
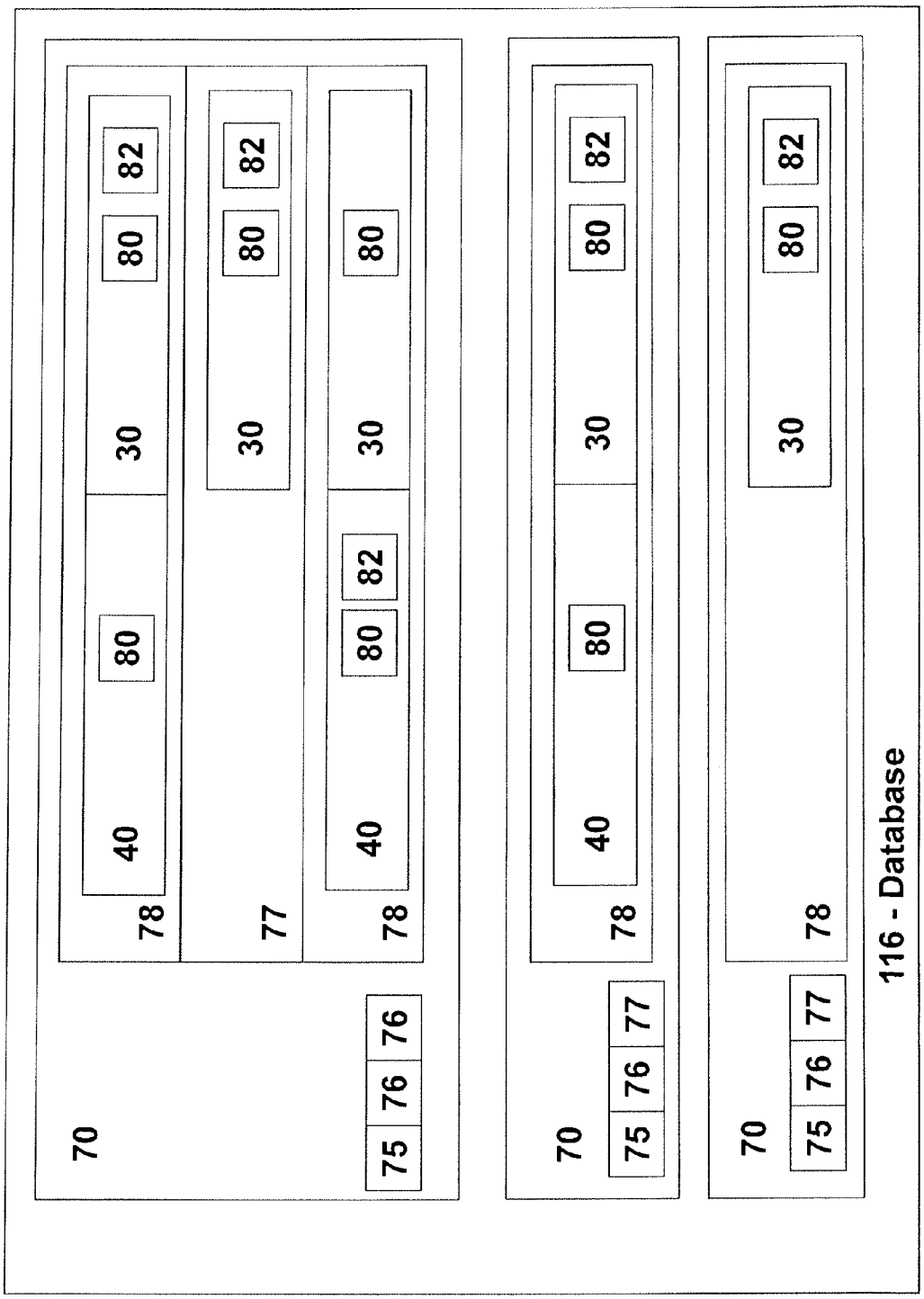
FIG. 3 is a more detailed view of a component of the block diagram of FIG. 2.

Referring to FIG. 3, in some embodiments of the present invention, the storage device 114 includes a database 116 for geo-fence polygon entries 70 that include geo-fence polygons 75 for the respective coverage area 35, 45 of the 3G and 4G cellular networks 30, 40. The database 116 may be relational databases or other known forms of databases. The geo-fence polygons 75 are virtual perimeters to represent the real-world geographic area or boundaries of areas within the coverage areas 35, 45 of the 3G and 4G cellular networks 30, 40 respectively. The geo-fence polygon 75 includes the known coordinates (e.g., longitude and latitude of area) of a particular boundary.

The geo-fence polygons 75 may be defined along a range of spatial levels, from higher levels to very granular levels. The geo-fence polygons 75 may be defined by different shapes, such as squares, rectangles (as shown in FIG. 1), or irregular shaped polygons. In one embodiment of the present invention, the geo-fence polygons 75 may be defined by Google Map Layers, ranging from Google map level 24 (measured in tiles that are approximately 2.4 meters square) to Google map level 16 (640 meters squared) to higher levels. In other embodiments, the polygons may directly follow riverbeds or national boundaries on a side. The more accurately the geo-fence polygons 75 are defined, the greater the accuracy of finding reliable network coverage.

Geo-fence polygon entries 70 are made for each specific geo-fence polygon 75. Each geo-fence polygon entry 70 includes an identifier 76 and the coordinates 77 of the geo-fence polygon 75 and the cellular network type 30, 40 whose coverage areas 35, 45 extend within the area defined by the geo-fence polygon 75. In some embodiments, the entry 70 may include the carrier identity 78 (i.e., Verizon, AT&T, Sprint, etc.) of the networks 30, 40 that reside within the area defined by the geo-fence polygon 75, as shown in FIG. 3.

The geo-fence polygon entries 70 of the database 116 may also include reliability data 80 of the cellular network 30, 40 coverage area 35, 45 retained within the geo-fence polygon 75. The reliability data 80 includes, but is not limited to, the signal strength, quality, availability, packet loss, retransmits, packet latency, throughput speed, and other cell tower signaling quality factors of the 3G/4G cellular network 30/40 defined by the geo-fence polygon 75. Such information is important because reliability data cannot be generalized due to the unpredictable effects that the topography of such coverage areas, such as valleys and mountain ranges, top of hills, bottom of hills, and various manmade structures, including buildings, bridges of iron and concrete etc., have on radio wave propagation. The geo-fence polygon entry 70 may also include a reliability indicator 82, which indicates whether or not the available 3G or 4G network 30, 40 is the reliable network within the geo-fence polygon 75 the wireless communication device 20 should utilize.

Since the coverage area 35, 45 of 3G and 4G cellular networks 30, 40 often overlap, a geo-fence polygon entry 70 may include information for all the 3G, 4G cellular networks 30, 40 operating within the geo-fence polygon 75, including the carrier identifiers 78 and associated reliability data 80 for each. Since some modems 102 communicate only with one carrier, it is possible to limit the information of the geo-fence polygon entry 70 to a single carrier. However, some modems 102 can communicate with multiple carriers. In either case, a geo-fence polygon entry 70 is not limited to information related to only one carrier. For example, the geo-fence polygon entries 70 maintained by the central server 60 can include information for multiple cellular networks of multiple carriers that are found within a given geo-fence polygon 75. The geo-fence polygon entries 70 may be supplied from information obtained directly from the network carriers, or may be assembled from information collected by the wireless communication devices 20, as explained in more detail below.

The network switching application 106 utilizes the information within each geo-fence polygon entry 70, including the geo-fence polygon 75 and its coordinates 77 and reliability data 80, to maintain the optimum cellular network connection. While the geo-fence polygon entries 70 may be found within a database 116 maintained on the storage device 114, the geo-fence polygon entries 70 may be stored on the RAM of the storage memory 108 in a limited fashion in other embodiments of the present invention.

The geo-fence polygon database 116 may be updated by the network switching application 106 when the cellular modem 102 discovers additional information about the cellular networks 30, 40. In additional embodiments, the geo-fence polygon database 116 maintained within the storage device 114 may be updated by the central server 60, or the central server 60 may provide limited geo-fence polygon data to the wireless communication device 20 for utilization by the system memory 108 based upon the location of the wireless communication device 20. In such situations, the network switching application 106 may call upon a central server 60 to provide geo-fence polygon data of other areas in which the wireless communication device 20 may enter based upon the direction its travel and speed, which may be determined by various means discussed below.

The wireless communication device 20 may include a system bus 118 that connects various components to the system memory 108 and to the storage device 114, as well as to each other. Other components of the wireless communication device 20 may include one or more processors or processing units 120, a user interface 122, an input/output interface 124, and a network adapter 126 that is configured to communicate with other devices over various networks.

In addition, some embodiments of the wireless communication device 20 may include a GPS module 128 that is configured to continuously communicate with GPS satellites 50 discussed above in order to obtain the location (for example, the latitude and longitude) of the wireless communication device 20. In some embodiments of the present invention, such information may be collected once per second. However, the rate of obtaining such information varies depending on the needs of the wireless communication device 20. When the wireless communication device 20 is in motion (i.e., when a moving vehicle), the GPS module 128 is configured to obtain the heading and the speed of the wireless communication device 20 through repeated data transmissions from the GPS satellites 50. For example, the GPS module 128 may be configured to determine the direction of travel in compass degrees from 0 to 360. The GPS module 128 may also calculate and report the travel speed of the wireless communication device 20 based upon the location information obtained, including the distance between two position location reports and the time it took to travel that distance. In some embodiments of the present invention, the GPS module 128 may reside on a chip set embedded within the wireless communication device 20 with an external antenna or an external GPS receiver. Examples of such chip sets include, but are not limited to, the SiRFSTAR III and SiRFSTAR IV GPS chip sets. As such, the GPS related information (latitude, longitude, speed, heading, and potentially altitude) may be calculated by the wireless communication device through the GPS module 128. While some embodiments of the present invention utilize a GPS module 128 in order to obtain the location, speed, and heading of the wireless communication device 20, other embodiments may be able to obtain such information through other sources and devices, such as, but not limited to, vehicle's speedometer and other navigational systems or wherever reliable real-time GPS data means. Such means may include triangulating cellular devices between multiple cell towers or other known location methods.

The network switching application 106 is configured to control the operation of the cellular modem 102 to ensure that the wireless communication device 20 is connected to the most reliable and efficient 3G or 4G cellular network 30, 40 available. In some embodiments, the network switching application 106 can connect the cellular modem to the most reliable and efficient cellular network 30, 40 available, regardless of network carrier. The network switching application 106 may utilize data from the cellular modem 102, the geo-fence polygon entries 70 stored in the database 116 of the storage device 114 or the system memory 108, and the GPS module 128 or other location and direction providing means to switch connections of the cellular modem 102 from a 3G cellular network 30 to a 4G cellular network 40 and vice versa.

Figure 4:
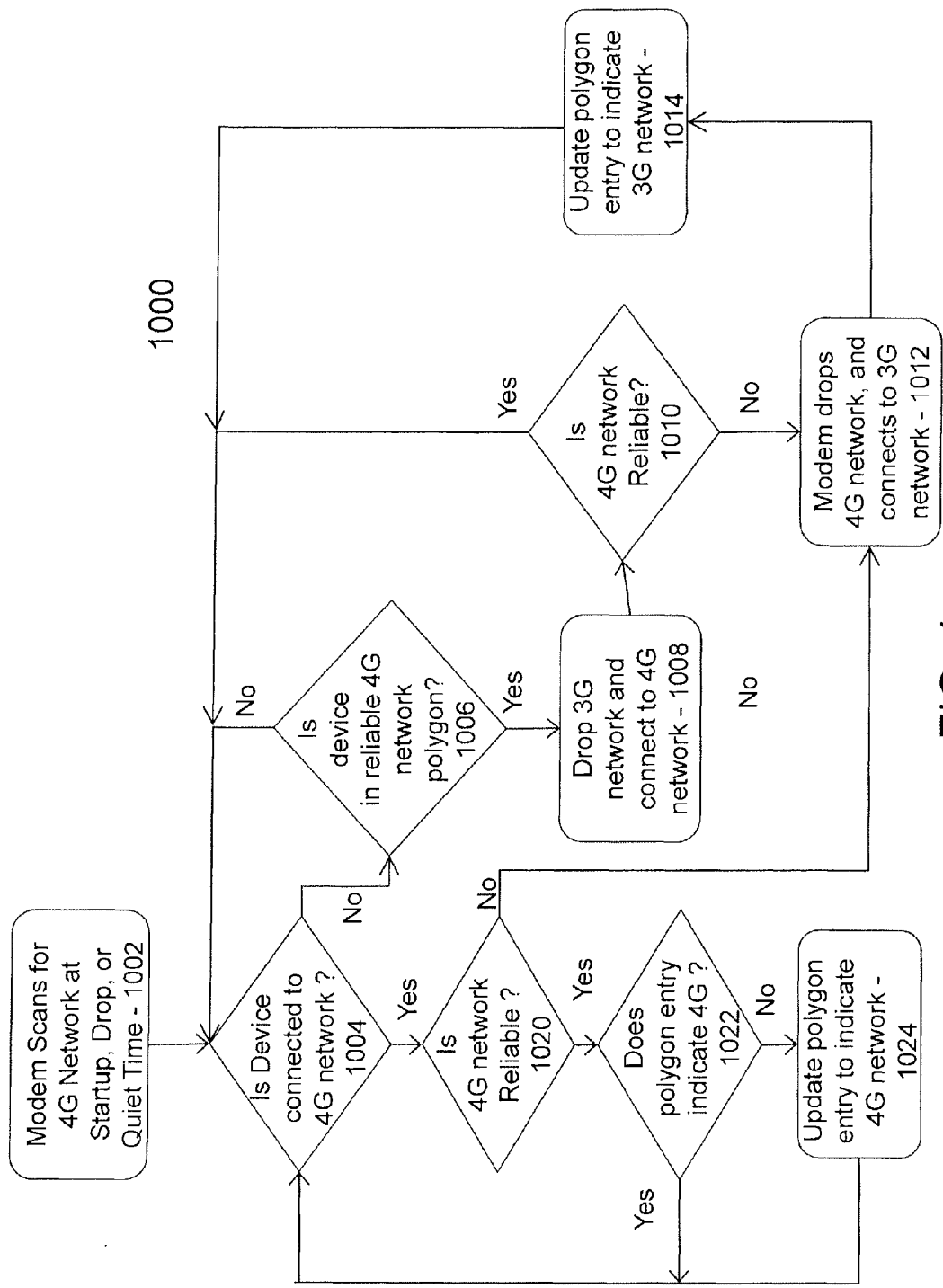
FIG. 4 is a flow diagram of a method performed by a wireless communication device according to an embodiment of the present invention.

FIG. 4 depicts a flow diagram 1000 that illustrates the operation of the network switching application 106 according to one embodiment of the present invention. Whenever the cellular modem 102 starts operating, has dropped and is restarting a connection, or has a "quiet" time of no data transmission, the cellular modem 102 will scan for the availability of a 4G cellular network 40 (step 1002). If the cellular modem 102 is able to connect to a 4G cellular network 40, it does so. If not, the cellular modem 102 will connect to a 3G cellular network 30. The switching application 106 will then determine whether or not the cellular modem 102 is connected to a 4G cellular network 40, or if a 4G cellular network 40 is available (step 1004).

If the cellular modem 102 is not connected to a 4G cellular network 40, the network switching application 106 can use current location information, obtained by the GPS module 128 or other known means, to calculate the present location of the wireless communication device 20 and find the corresponding geo-fence polygon entry 70 to determine if the wireless communication device 20 is currently located in a reliable 4G network 45 service area polygon 75 (step 1006).

If the wireless communication device 20 is in a geo-fence polygon 75 that includes a reported reliable 4G cellular service area 45 provided by a carrier 78 that the modem 102 utilizes, the network switching application 106 will force the cellular modem 102 to drop an active 3G connection, and initiate a connection to the 4G cellular network 40 within the service area 45 (step 1008). The reliability of the coverage area 45 of the cellular network 40 within the given geo-fence polygon 75 may be indicated with the reliability indicator 82. In such cases in which the modem 102 is capable of operating on multiple 3G and/or 4G cellular networks 30/40 (i.e., the modem can operate on cellular networks provided by different carriers), the network switching application 106 can direct the modem 102 to connect to the 3G network 30 or 4G cellular network 40 of the carrier that has the higher(est) reliability within the polygon 75.

Once the cellular modem 102 has switched to the 4G cellular network 40, the cellular modem 102 will determine whether or not the connection within the network coverage area 45 is actively reliable (step 1010). The cellular modem 102 may look to the signal strength, quality, availability, packet loss, retransmits, packet latency, throughput speed, and other signaling quality factors for such a determination, comparing such information to one or more reliability thresholds that must be met in order for the 4G cellular network 40 to be considered reliable. At this point, it is possible for the network switching application 116 to update the reliability data 80 of the corresponding geo-fence data entry 70 with the information obtained by the cellular modem 102. If the cellular modem 102 determines the 4G cellular network 40 is reliable, the cellular modem 102 maintains the 4G connection and the network switching application 106 returns to step 1004. The reliability thresholds may simply be a value that the signal strength, quality, availability, packet loss, retransmits, packet latency, or throughput speed are compared to, or a value after the aforementioned inputs are combined.

If the cellular modem 102 determines the 4G connection of the 4G cellular network 40 provided by the carrier 78 of the cellular modern 102 is not reliable or inadequate, the cellular modem 102 can drop the 4G connection, and re-establish the 3G connection with the 3G cellular network 30 (step 1012). The network switching application 106 will determine that the 4G connection was dropped, even though the geo-fence polygon entry 70 reports the 4G network 40 within the geo-fence polygon 75 as reliable through the reliability indicator 82. The network switching application 106 will obtain the current location of the wireless cellular device 20 and use that to determine the corresponding geo-fence polygon entry 70 and geo-fence polygon 75 for the 4G service area 45 in which the wireless cellular device 20 is located. The network switching application 106 will update the corresponding geo-fence polygon entry 70 (step 1014), including marking the 4G network 40 of the carrier 78 of the cellular modem 102 as unreliable for 4G connectivity or removing the reliability indicator 82, and designating the corresponding 3G cellular network 30 as the reliable network with the reliability indicator 82. The network switching application 106 may report the updated reliability data 80 of the 4G connection quality and GPS position data to database 116 of the central server 60.

Returning to step 1004, if the network switching application 106 determines the cellular modem 102 is connected to a 4G cellular network 40, the cellular modem 102 will determine whether or not the 4G cellular network 40 is reliable (step 1020). If the cellular modem 102 finds the 4G cellular network 40 unreliable, as described in step 1010, the cellular modem 102 will disconnect from the 4G cellular network 40 and connect to the available 3G cellular network 30 (step 1012).

If the cellular modem 102 determines that the 4G cellular network 40 is reliable, the network switching application 106 will determine if the corresponding geo-fence polygon entry 70 indicates the 4G cellular network 40 as the reliable network within the geo-fence polygon 75, as indicated by the reliability indicator 82 (step 1022). If the 4G cellular network 40 of the corresponding geo-fence polygon entry 70 is reported as reliable (having the reliability indicator 82), the network switching application returns to step 1004. If the network switching application 106 finds that the reliability indicator 82 is associated with the 3G cellular network 30 of the corresponding geo-fence polygon entry 70, the geo-fence polygon entry 70 is updated to show the 4G cellular network 40 is assigned the reliability indicator 82 (step 1024). Once the network switching application 106 updates the geo-fence polygon entry 70, and the corresponding database 116, the process returns to step 1004.

Figure 5:
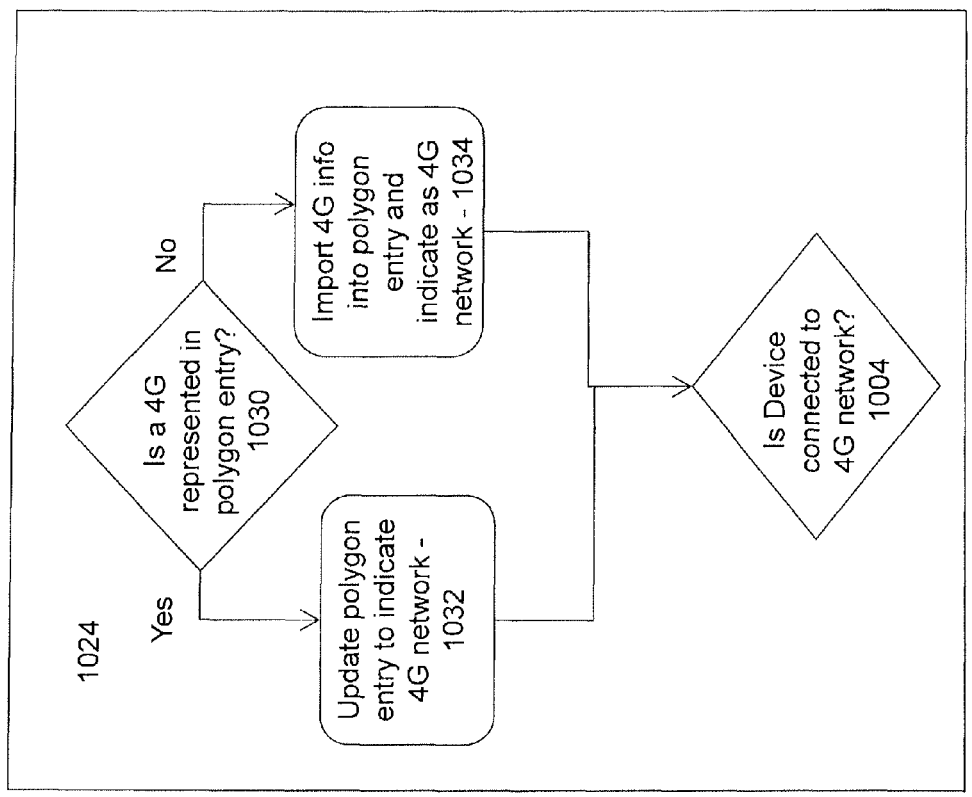
FIG. 5 is a flow diagram of part of the method of FIG. 4 according to an embodiment of the present invention.

When any wireless communications device 20 travels into an area where the corresponding geo-fence polygon entry 70 includes only information related to a 3G cellular network 30, and there is a reliable 4G network 40 accessible within the geo-fence polygon 75, the network switching application 106, in combination with information obtained from the cellular modem 102, may update the geo-fence polygon entry 70 (step 1024) to include information about the 4G cellular network 40, as shown in FIG. 5. At this point in time, the network switching application 106 and the cellular modem 102 have determined that there is a reliable 4G cellular network 40 that is not represented as a reliable network in corresponding geo-fence polygon entry 70 (steps 1004, 1020 and 1022). The network switching application 106 will determine whether or not the 4G cellular network 40 is represented in the polygon entry 70 (step 1030). If the 4G cellular network 40 is represented in the geo-fence polygon entry 70, the network switching application 106 will simply update the geo-fence polygon entry 70 by applying the reliability indicator 82 to the 4G cellular network 40. If there is no corresponding 4G cellular network 40 information within the geo-fence polygon entry 70, the network switching application 106 obtains the needed information (4G cellular network 40, carrier 77, reliability data 80) gathered by the cellular modem 102 and enters the information into the geo-fence polygon entry 70 (step 1034) stored in the database 116 of the storage system 114 or system memory 108 of the wireless communication device 20. After both steps 1032 and 1034, the network switching application 102 returns to step 1004.

Figure 4A:
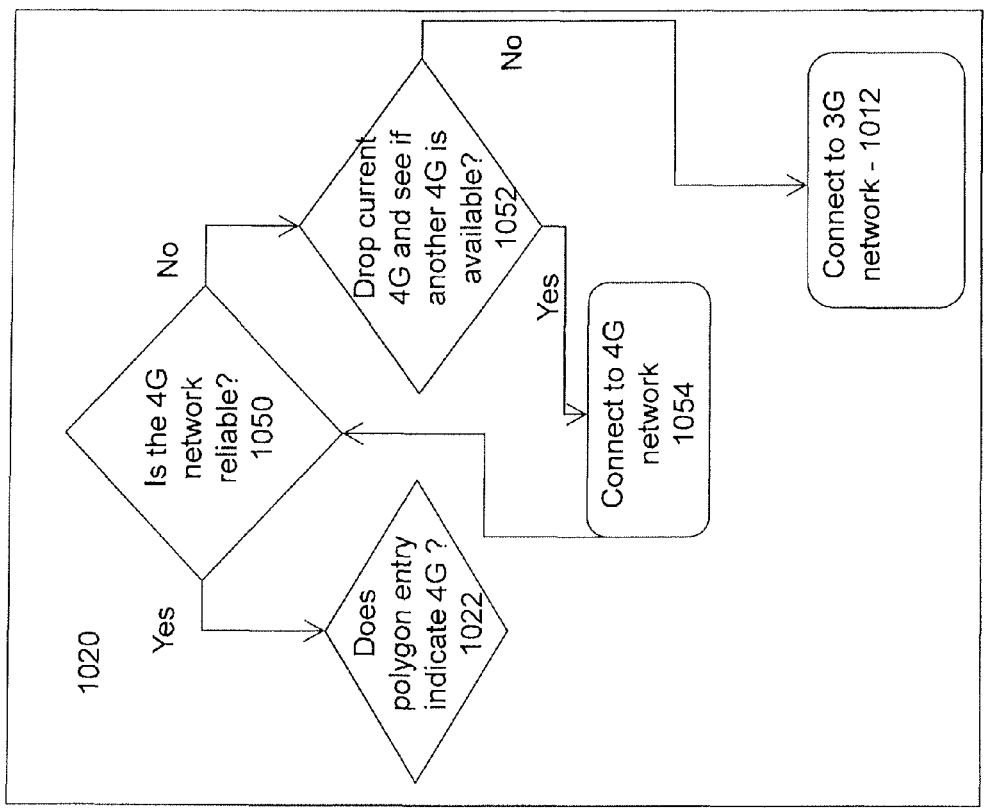
FIG. 4a is a flow diagram of part of the method of FIG. 4 according to an embodiment of the present invention.

In embodiments in which the cellular modem 102 is capable of communicating on multiple 3G cellular networks 30 or 4G cellular networks 40, the network switching application 106 can determine if another 3G network 30 or 4G network 40 is available when the 3G cellular network 30 or 4G cellular network 40 to which the modem 102 is already connected is not reliable (step 1020), as shown in FIG. 4*a*. If the cellular modem 102 is connected to a 4G cellular network 40, the cellular modem 102 will determine whether or not the 4G cellular network 40 is reliable (step 1050).

If the 4G cellular network 40 to which the cellular modem 102 is connected is reliable, the cellular modem 102 will return to step 1022 as described above. If the 4G cellular network 40 is not reliable, the network switching application 106 will check to see if another 4G cellular network 40 is available (step 1052). The network switching application 106 can call on the cellular modem 102 to determine whether or not another 4G cellular network 40 is available. The modem 102 will drop its connection to the current 4G cellular network 40 to search for another 4G cellular network 40. If the cellular modem 102 finds another 4G cellular network 40, the network switching application 106 will direct the cellular modem 102 to connect to the newly found 4G cellular network 40 (step 1054), after which the network switching application 106 will call on the cellular modem 102 to find out if the 4G cellular network 40 is reliable (step 1050). If the cellular modem 106 finds no other 4G cellular network 40 available, the modem 106 will drop the 4G cellular connection, and will connect to the 3G cellular network 30 (step 1012). While the method and steps above mention switching between two 4G cellular networks 40, the method and steps are equally applicable to switching between 3G cellular networks 30 of different carriers, and any other equivalent network carried by different carriers.

The process 1000 above is constantly repeated by the network switching application 106, comparing the location of the wireless communication device 20 and the current connection of the cellular modem 102, and all information generated from such a connection, to the corresponding geo-fence polygon entry 70. The analysis is done on a continuous loop regardless of whether the wireless communication device 20 is stationary or moving. For the most part, the process will continue to return to step 1004, unless the cellular modem 102 experiences a drop or "quiet time", at which point the process will return to step 1002.

Having thus described an exemplary embodiment of the operation of the network switching application 106, those skilled in the art will appreciate that the steps above may be performed in a different order or combination.

The constant monitoring, reporting, and updating of cellular networks performed by the combination of the cellular modem 102 and the network switching application 106 allows the geo-fence polygon entries 70 within the database 116 to be updated to reflect the availability of a reliable 3G and 4G cellular networks 30, 40 for the corresponding geo-fence polygon 75. The process makes the network reliability database 116 self-healing. When implemented by multiple wireless communication devices 20 that continuously report the updated entries 70/database 116 to a central server 60, the process leverages "crowd sourcing". The first wireless communications device 20 to sense a 4G cellular network 40 within a geo-fence polygon 75 that was previously formerly designated as a part of a 3G cellular service area 35 will update the corresponding geo-fence polygon entry 70 to reflect the new discovery and report the change to the central server 60. Then all other wireless communications devices 20 will receive the updated geo-fence polygon entry 70 identifying the new availability of 4G cellular network 40 in the corresponding geo-fence polygon 75.

In all cases the network switching application 106 will continuously perform this programming loop of checking for reliable connectivity to 4G cellular networks 40, as the vehicle is traveling in and out of 4G service area polygons/grid cells. The continuous checking and reporting of various 3G and 4G cellular connectivity quality factors, automatically updating actual cellular connectivity metrics for various geo-fence polygons 75 and corresponding entries 70, provides the ability for the network switching application 106 to maximize 4G connectivity while a wireless communication device 20 is in motion across various cellular coverage areas 35/45. The maximization of 4G cellular network connectivity is maximized further when the process above is employed by numerous wireless communication devices 20 of a fleet, which can report findings to the central server 60, discussed below.

Figure 6:
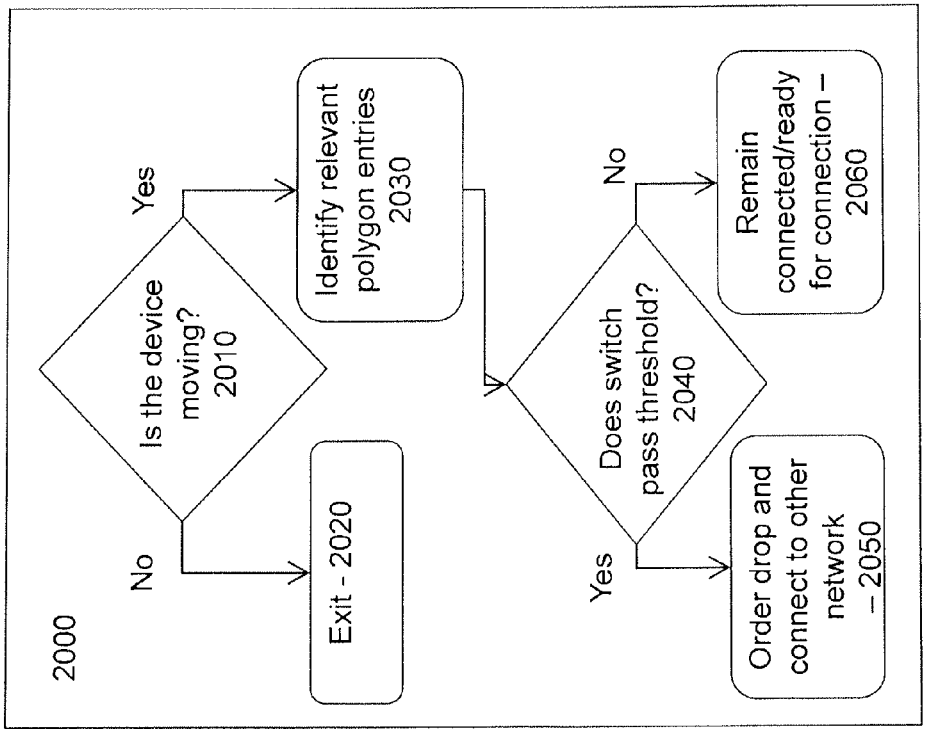
FIG. 6 is a flow diagram of a method performed by a wireless communication device according to an embodiment of the present invention.

According to some embodiments of the present invention, the network switching application 106 looks ahead for the potential networks that the wireless communication devices 20 will enter to assist in maintaining, dropping, or initiating cellular connections with 3G and 4G cellular networks 30, 40. FIG. 6 depicts a flow diagram 2000 that illustrates the look ahead operation of the network switching application 106 according to one such embodiment of the present invention. The network switching application 106 first determines whether or not the wireless communication device is moving (step 2010). The network switching application 106 can call on the GPS module 128 for such information (e.g., speed, direction, etc.). If the network switching application 106 determines that the wireless communication device 20 is not moving, the network switching application 106 can exit the look ahead process (step 2020) and perform other processes or continue to monitor for its movement.

Figure 7:
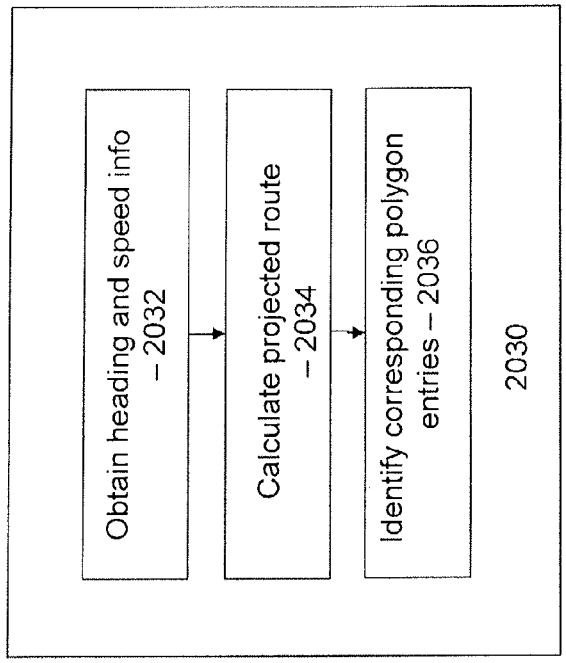
FIG. 7 is a flow diagram of part of the method of FIG. 4 according to an embodiment of the present invention.

If the wireless communication device 20 is moving, the network switching application 106 will then determine the relevant geo-fence polygon entries 70 that the wireless communication device 20 will travel through (step 2030), as shown in FIG. 7. The network switching application 106 will obtain the speed and heading information of the wireless communication device 20 (step 2032). The network switching application 106 can obtain this information directly from the GPS module 128 itself, or obtain other information from the GPS module 128 that will allow the network switching application 106 to calculate the heading and speed. Using the heading and speed, the network switching application 106 can then determine the projected route of travel of the wireless communication device 20 (step 2034) and identify the corresponding geo-fence polygon entries 70 (step 2036). If the wireless communication device 20 does not have corresponding polygon entries 70 stored locally in its storage device 116 or local system memory 108, it can request such entries from another source, such as the central server 60 discussed below.

Returning to FIG. 6, the network switching application 106 can then determine whether switching from one network to another creates a benefit or reward that is greater than a switching threshold (step 2040). If the benefit of switching from one cellular network to another is greater than an established threshold, the network switching application 106 will instruct the cellular modem 102 to drop its current connection and connect to the other network (step 2050). If switching does not create a benefit greater than the threshold, the network switching application 106 will instruct the cellular modem 102 to remain connected or ready for the same connection if a drop occurs (step 2060).

The switching threshold may be based upon certain values that can be compared to corresponding information available to the network switching application 106. For example, the switching threshold may include, but is not limited to, the time connected to a faster cellular network, throughput, packet latency, signal strength and the like or combinations of the preceding examples. The switching threshold(s) may be standardized, set up automatically, or manually. The network switching application 106 can utilize more than just one switching threshold.

For example, the switching threshold may be set based upon the minimum amount of time that the wireless communication device 20 will experience a connection to a 4G cellular network 40. The wireless communication device 20, currently connected to a 3G network 30, may have a projected route of travel through a 4G cellular network coverage area 45 for forty seconds before reentering into a 3G cellular network service area 35. In this example, the switching threshold requires that the connection to the 4G cellular network 40 must be for at least thirty five seconds before the network switching application 106 will order the modem 102 to disconnect from the 3G cellular network 30 and connect to the 4G cellular network 40. In such an example, the benefit exceeds the switching threshold (forty seconds to thirty five seconds) (step 2040), so the network switching application 106 will order the cellular modem 102 to disconnect from the 3G cellular network 30 and connect to the 4G cellular network 40 (step 2050).

The network switching application 106 may also take into consideration the restraints of the operations needed to switch from network to network, including the required time for such operations to occur, when making the same benefit determination (step 2040). For example, expounding on the example of the wireless communication device 20 being within a 4G cellular coverage area 45 for forty seconds as discussed above, the network switching application 106 may determine that the time required for switching from the 3G network 30 to the 4G network 40 is ten seconds. The time required to switch only allows the wireless communication device 20 to be connected to the 4G cellular network 40 for thirty seconds. Therefore, the benefit (thirty seconds connected to the 4G cellular network 40) does not exceed the switching threshold (thirty-five seconds) (step 2040). In this case, the network switching application 106 will not allow the wireless communication device to switch from the 3G cellular network 30 to the 4G cellular network 40 (step 2060).

Figure 8:
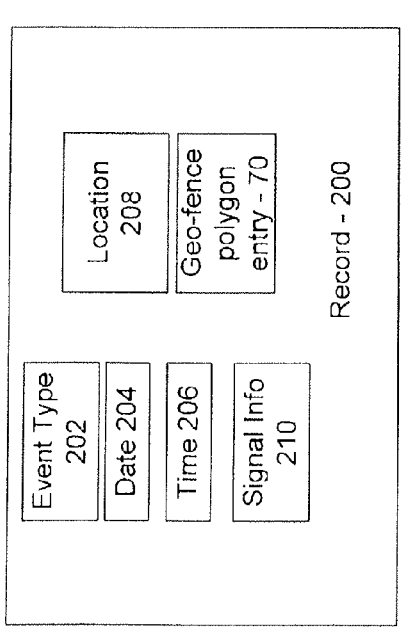
FIG. 8 is a block diagram of the central server of the system of FIG. 1 according to an embodiment of the present invention.

In some embodiments of the present invention, the network switching application 106 may assist in collecting information relating to the reliability of the 4G cellular network 40 and 3G cellular network 30. The networking application 106 may create a record 200 of an event 202 that the cellular modem 102 experiences at different locations within a 3G or 4G cellular network coverage area 35, 45 and for different events. For example, when the wireless communication device 20 is disconnected from a 4G cellular network 40, such as when the wireless communication device 20 exits from a the 4G cellular network coverage area 45, the network switching application 106 can create a record 200 of the drop 202, as shown in FIG. 8. The record 200 can include date information 204, time information 206, location information 208, and signal information 210, including signal strength, throughput, packet drop ratio, and the like, from the GPS module 128 and the cellular modem 102, and from the wireless communication device 20 itself. The network switching application 106 may couple this information with the already established geo-fence polygon/grid cell entry 70 associated with the 4G cellular network geo-fence polygon 75.

The same can be done for a drop within a geo-fence polygon 75 of a 3G cellular network 30. Along the same lines, a record 200 can be created for a status event 202, when the cellular modem 102 remains connected a 4G cellular network 40 or 3G network 30, containing the same information as stated above. Such a record is useful in determining the reliability of the coverage areas 35, 45 of the 3G cellular networks 30 and 4G cellular networks 40 at given locations 208 defined by the respective geo-fence polygon 75. Records 200 can be used to determine whether the geo-fence polygon 75 associated with a 3G or 4G cellular network coverage area 35, 45 is accurate, or needs to be adjusted.

The network switching application 106 may also create a record 200 when the wireless communication device 20, through the cellular modem 102, finds a 4G cellular network 40 that was not previously known. If the cellular modem 102 discovers a new 4G cellular network 40 and determines that the network 40 at those locations is reliable, determined from the signal information 210 collected by the cellular modem 102, the network switching application 106 can obtain location information 208 from the GPS module 128 and create a record 200 documenting the connection. In such instances, the network switching application 106 will continuously create records 200 while connected and up to the disconnecting of the cellular modem 102 from the newly discovered 4G cellular network 40 to help establish the geo-fence polygons 75 of the 4G cellular network 40 through which the wireless communication device 20 travels. A new geo-fence polygon entry 70 may be made from the records, taking the signal information 210 to determine the reliability data 80 of the newly created geo-fence polygon 75 of the coverage area 45 of the new 4G cellular network 40.

Similarly, the network switching application 106 can create a record 200 when the cellular modem 102 produces reliable signal information 210 for a 4G cellular network 40 in a geo-fence polygon 75 that was previously is identified as unreliable by the associated reliability data 80 of its geo-fence polygon entry 70, indicating an improvement of the signal quality in the coverage area 45.

The network switching application 106 can then utilize the records 202 to maintain and update the geo-fence polygon information 212 that is has retained, maintain, update or create new geo-fence polygon entries 70, or can send such records to the central server 60, as discussed below.

Figure 9:
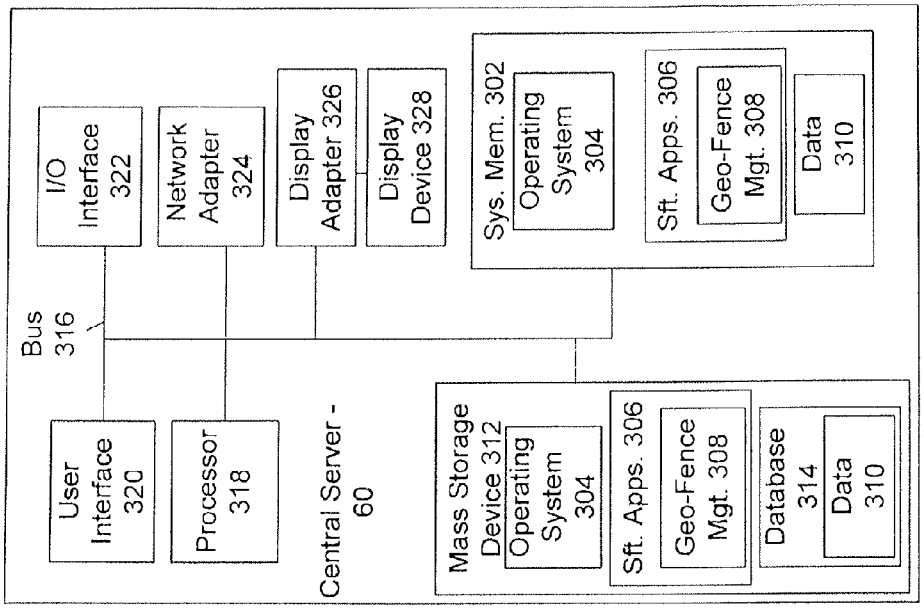
FIG. 9 is a block diagram of a record according to an embodiment of the present invention.

As shown in FIGS. 1-2 and 9, the automated cellular network system 10 may include a central server 60. The central server 60 may have several applications 304, including but not limited to a network geo-fencing management application 308, discussed in further detail below. The network geo-fencing management application 308 may utilize elements and/or modules of the various applications that may utilize several nodes or servers. In any event, the phrase central server 60 should be construed as inclusive of multiple modules, software applications, and other components that are separate from the wireless communication devices 20.

Referring to FIG. 9, the central server 60 includes its own system memory 302, which stores the operating system 304 and various software applications 306, including the network geo-fencing management application 308. The central server 60 may also include data 310 that is accessible by the software applications 306. The remote central server 60 may include a mass storage device 312. The mass storage device 312 can be used for storing computer code, computer readable instructions, program modules, various databases, including a reliability database 314, and other data for the server 60. The mass storage device 312 can be used to back up or alternatively to run the operating system 304 and/or other software applications 302. The mass storage device 312 may include a hard disk, various magnetic storage devices such as magnetic cassettes or disks, solid state-flash drives, CD-ROM, DVDs or other optical storage, random access memories, and the like.

The central server 60 may include a system bus 316 that connects various components to the system memory 302 and to the mass storage device 312, as well as to each other. Other components of the central server 60 may include one or more processors or processing units 318, a user interface 320, an input/output interface 322, and a network adapter 324 that is configured to communicate with other devices over various networks, including, but not limited to cellular networks 30, 40. In addition, the central server 60 may include a display adapter 326 that communicates with a display device 328, such as a computer monitor and other devices that present images and text in various formats.

A system administrator can interact with the network geo-fencing management application 308 and other software applications 306 on the central server 60 through one or more input devices (not shown), which include, but are not limited to, a keyboard, a mouse, a touch-screen, a microphone, a scanner, a joystick, and the like, via the user interface 318.

In one embodiment of the present invention, the automated cellular network system 10 utilizes the central server 60, and more specifically the network geo-fencing management application 308 and the reliability database 314, to communicate, manage, and update the geo-fence polygon entry 70 associated with each geo-fence polygon 75 of the known 3G and 4G cellular networks 30, 40 for the wireless communication devices 20.

Figure 10:
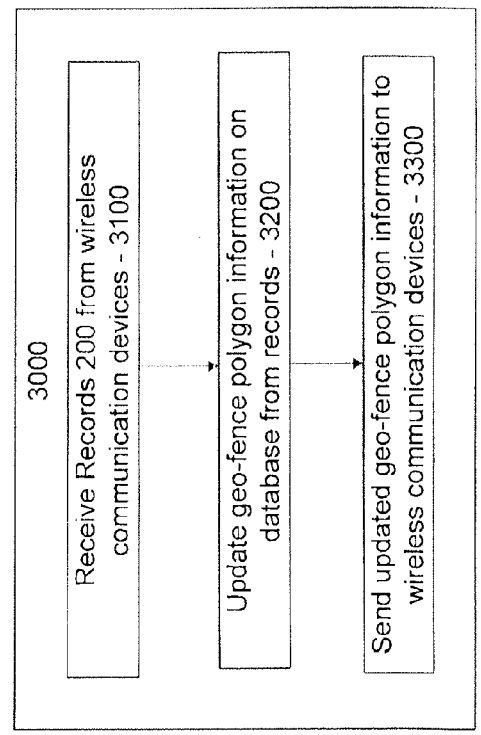
FIG. 10 is a flow diagram of a method of updating a central database performed by the system of FIG. 1 according to an embodiment of the present invention.
Figure 11:
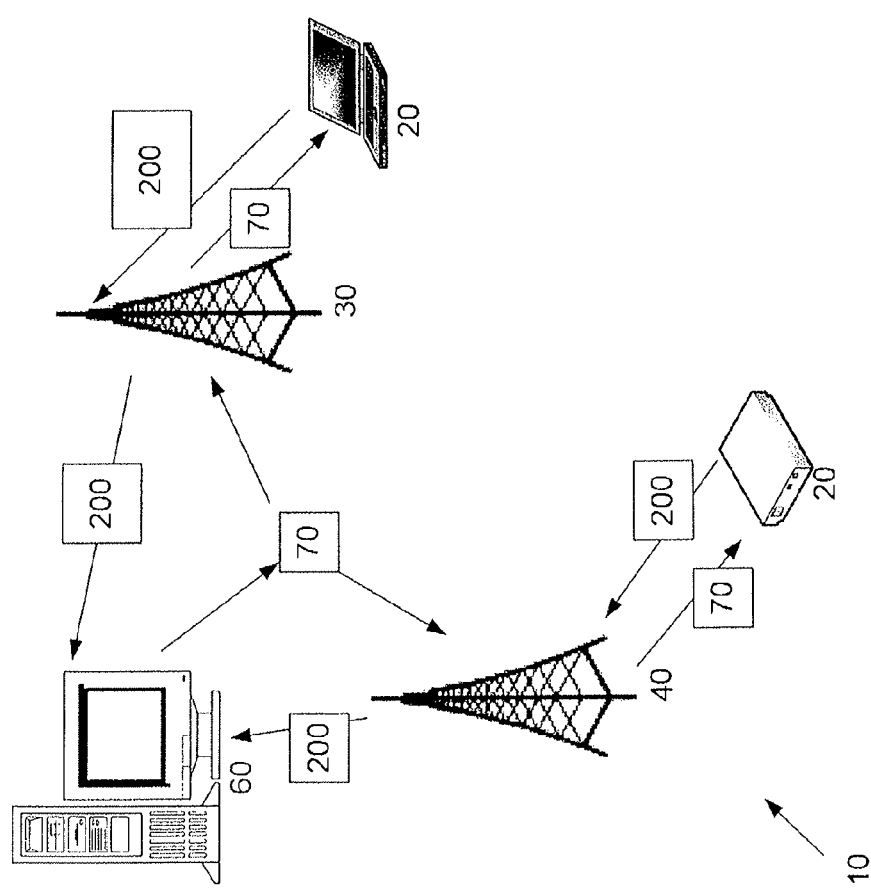
FIG. 11 is a block diagram of a system illustrating the performance of selected portions of the updating of the central database.

FIG. 10 depicts a flow diagram 3000 that illustrates the operation of the network geo-fencing management application 308 according to one embodiment of the present invention. The geo-fencing management application 308 will receive records 200 from the wireless communication devices 20 (Step 3100). As depicted in FIG. 11, the records can be sent over a 3G cellular network 30 or a 4G cellular network 40, depending on the location of the wireless communication device 20. The records 200 prepared by the network switching application 106 may be sent out from each wireless device 20 as they are prepared, or the networking switching application 106 may bundle the records 200 together for transmission at regularly scheduled intervals. In some embodiments of the present invention, the network switching application 106 may retain the records 200 on the storage device 114 or system memory 108 until the records can be downloaded to the central server 60 once the wireless communication device 20 returns to base.

Figure 12:
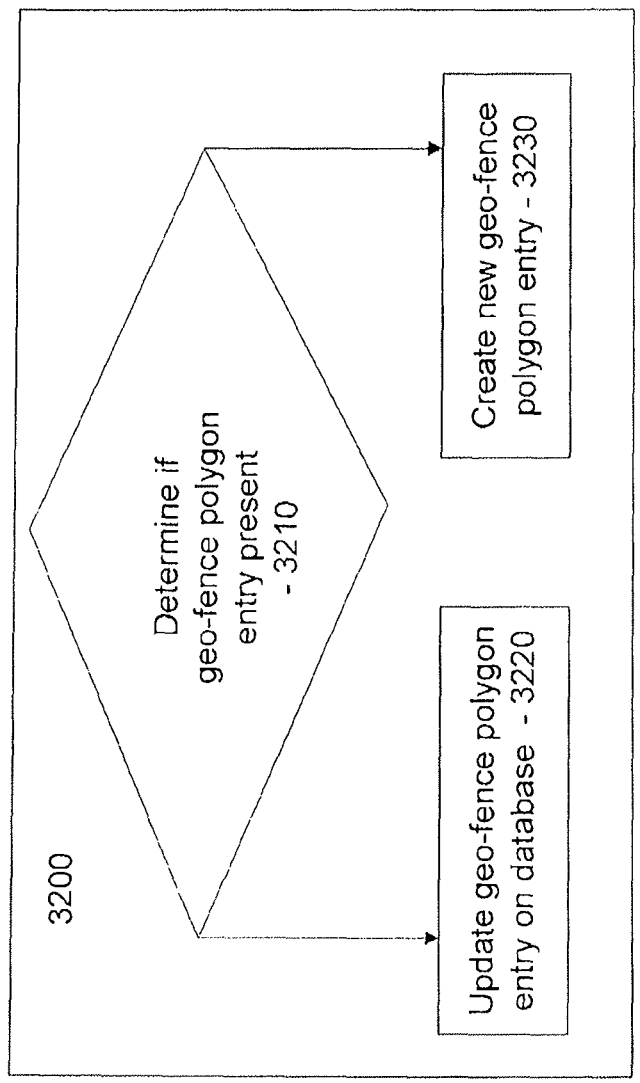
FIG. 12 is a flow diagram illustrating portions of the updating method of FIG. 10.

Upon receiving the records 200, the geo-fencing management application 308 can then update the geo-fence polygon entries 70 on its reliability database 314 (step 3200), shown in more detail in FIG. 12.

Similar to the wireless communication devices 20, the network geo-fencing management application 308 can update the geo-fence polygon entries 70 as it receives records 200, at regular intervals, or once the central server 60 has received all of the records 200 produced by the wireless communication devices for a given day. The network geo-fencing management application 308 will examine the records 200 to find a corresponding geo-fence polygon entry 70 within the database 314 (step 3210). If a corresponding entry 70 is found, the network geo-fencing management application 308 will update the geo-fence polygon entry 70, including the reliability data 80 and reliability indicator 82 based upon the location 208 signal information 210 received in the database 314 (step 3220). If a corresponding entry is not found, the network geo-fencing management application 308 will create a new geo-fence polygon entry 70 within the database 314, using the location information (3230).

In some embodiments of the present invention, the network geo-fencing management application 308 may receive updated geo-fence polygon entries 70 directly from the wireless communication devices 20 in addition to records 200. The process described in FIG. 11 may be done with update geo-fence polygon entries 70 obtained directly from the wireless communication devices 20.

While the network geo-fencing management application 308 can update the geo-fence polygon entries 70 at a variety of times, it is preferable that the updates occur as new records 200 are received, creating an up-to-date database 314. In addition, all the changes to the records 200 may be logged in order to allow the network geo-fencing management application 308 to review and find patterns of the quality of the 3G and 4G cellular networks 30, 40 in the various geo-fence polygons 75 at various times throughout the day. In some embodiments of the present invention, the network geo-fencing management application 308 can use past data to predict the performance of a network at a given location at a given time and pass that information along to the wireless communication devices 20.

Returning to FIG. 11, once the geo-fence polygon entries 70 are updated, the network geo-fencing management application 308 will then make the updated geo-fence polygon entries 70 available to the wireless communication devices 20 (step 3300). The present invention encompasses both local database storage and real-time data lookup techniques to provide information about reliable 3G and 4G cellular coverage areas 35, 45 and their corresponding geo-fence polygons 75 for the wireless communication devices 20. In one embodiment of the present invention, the network geo-fencing management application 308 will transmit the updated geo-fence polygon entries 70 to wireless communication device 20, with the network switching application 108 assisting in updating the database 116 with such information. Such updates can be sent on a periodic basis, or can be downloaded to the wireless communication devices 20 at the beginning of the shift. In some embodiments of the present invention, the wireless communication devices 20 include a globally unique serial number and other unique identifiers, such as MAC addresses, which allow the central server 60 to track and report on the wireless communication devices 20 based upon their unique identifiers.

In another embodiment of the present invention, the wireless communication devices 20 can request a real-time lookup of the updated geo-fence polygon entries 70 from the central server 60. However, periodically updating the database 116 of the wireless communication device 20 will often eliminate the need for the data transmission overhead of real-time lookups of reliable 4G geo-fence polygons 75. In this instance the network switching application 108, via the cellular modem 102, would continuously make real-time database requests to the network geo-fencing management application 308 on the central server 60 to download geo-entry polygon entries 70 for adjacent geo-fence polygons 75 around the current geo-fence polygon 75 in which the vehicle/wireless cellular device 20 is located. The adjacent geo-entry polygon entries 70 could be kept in RAM memory and not stored in the local database 116 of wireless communication device 20 and yet still provide the capability to determine when to switch cellular communications from 3G mode to 4G mode.

In another embodiment of the present invention, a hybrid combination of local database storage of and real-time requests for geo-fence polygon entries 70 can occur. For example, the database 116 of a wireless communication device 20 may only have geo-fence polygon entries 70 for a particular region (e.g., the metro Atlanta, the state of Pennsylvania, USA, a diameter of 25 miles around the vehicle's home service center, or another definition of region are all possible examples). When the wireless communication device 20 travels outside of its particular region, the network switching application 106 may request real-time downloads for geo-fence polygon entries 70 located in the direction of the current heading. Such downloads may be stored on the local database 116 or within the system memory 106.

It is anticipated that the cellular modems 102 of the present invention will be provided by and linked to a number of public wireless network providers such as AT&T, Sprint, and Verizon, and also for a number of private wireless network providers such as the Public Safety Broadband Network, New York City NYCWIN network, and other private 4G and 3G wireless communications networks around the world. The network reliability database 314 of the central server 60 will capture and categorize network reliability data records for each network, and can make 4G polygon network reliability data available to all users and customers of each type of public and private wireless network. So customers using cellular modem 102 provided by a public or private wireless network provider could have the benefit of network reliability data from all other users of a carrier's cellular modem 102 who are also reporting data to the central server's reliability database 314.

Embodiments of the automated cellular network switching systems 10 that utilize a central server 60 to maintain updated records regarding reliable 4G cellular coverage areas 45 are especially valuable to businesses dependent on fleets of vehicles for their business operations. The collective reporting power of the vehicles enhances the operation of the network switching applications 106 by having updated geo-fence polygon information. The larger the fleet, the more effective the automated cellular network switching system 10 becomes.

Further, reliable 4G cellular coverage geo-fence polygon information can also be shared across multiple enterprise fleets. As a result, reliable 4G cellular coverage geo-fence polygon entries 70 collected by the vehicle fleet of one enterprise that is part of the same automated cellular network switching system 10 can be shared and leveraged by vehicle fleets of other enterprises within the same system 10. Collecting and sharing reliable 4G cellular coverage geo-fence polygon entries 70 with wireless communication devices 20 in multiple enterprises will provide more effective and accurate "crowd source" reporting reliable 4G cellular coverage geo-fence polygon entries 70 than could be achieved by vehicles in a single enterprise alone.

The advantages of the present invention include, without limitation, providing field personnel who are using cellular data communications while operating a vehicle with the ability to maximize the use of higher 4G bandwidth to more safely, efficiently, and effectively do their work. The vehicle driver does not have to be concerned with knowing on a second by second basis whether the vehicle, and the wireless communication device 20, is in 3G or 4G network coverage areas. Furthermore, the vehicle driver is not distracted by having to attempt to manually maintain a fast 4G cellular data communications connection. This is particularly the case when the wireless communication device 20 does not have a keyboard and screen, like a wireless router, and it is not practical for the driver to manually restart the wireless communication device 20 to force an initial connection attempt to connect to a 4G cellular network 40.

Further, embodiments of the present invention are capable of collecting and reporting current reliable 4G cellular coverage geo-fence polygon information, without the driver in the vehicle having to provide any manual input or otherwise be engaged in connection drops and discovery of 4G cellular networks. Having automatic fact-based reporting of the exact location and date/time of 4G cellular connection drops and discovery will help maximize the utilization of 4G coverage when a vehicle is within the boundaries of a 4G coverage area. The location of actual 4G coverage drops can also be shared with the cellular carriers to assist them in filling in 4G coverage gaps and generally improving the quality—availability and reliability—of 4G cellular coverage in the areas where the vehicle driver with the wireless communication device travels in the course of his service delivery and/or public safety work. Automatic discovery of new 4G cellular coverage geo-zone polygons allows the enterprise to use higher bandwidth 4G connectivity whenever it becomes available, regardless of whether the new 4G coverage has been reported by the cell carrier.

To the extent necessary to understand or complete the disclosure of the present invention, all publications, patents, and patent applications mentioned herein are expressly incorporated by reference therein to the same extent as though each were individually so incorporated.

Having thus described exemplary embodiments of the present invention, those skilled in the art will appreciate that the within disclosures are exemplary only and that various other alternatives, adaptations, and modifications may be made within the scope of the present invention. Accordingly, the present invention is not limited to the specific embodiments as illustrated herein, but is only limited by the following claims.

What is claimed is:

1. A wireless communication device comprising:
   a) memory;
   b) a processor;
   c) a wireless modem configured to communicate on a first wireless network and a second wireless network, wherein the first wireless network is slower than the second wireless network; and
   d) a network switching application configured to manage connections of the wireless modem, wherein the network switching application is configured to automatically direct the cellular modem to terminate a first connection to the first wireless network and establish a second connection to the second wireless network while the wireless modem is connected to the first wireless network when the network switching application determines that the second connection to the second wireless network is available based on stored information associated with network coverage area of the second wireless network, wherein the network switching application utilizes information associated with network coverage areas of the first wireless network and the second wireless network to manage the connections of the wireless modem to the second network and the first wireless network, wherein the information for the network coverage areas of the first wireless network and the second wireless network is stored within a geo-fence polygon entry, wherein each geo-fence polygon entry contains the information for portions of the network coverage areas found within a corresponding geo-fence polygon.

2. The wireless communication device of claim 1, wherein the wireless modem is configured to automatically connect to the first wireless network when the second wireless network is unavailable or unreliable.

3. The wireless communication device of claim 1, wherein the information for the network coverage areas of the first wireless network and the second wireless network stored within the geo-fence polygon entries further comprises reliability data.

4. The wireless communication device of claim 3, wherein the wireless modem further comprises a cellular modem, the first wireless network comprises a 3G cellular network, and the second wireless network comprises a 4G cellular network.

5. The wireless communication device of claim 3, wherein the wireless modem further comprises a cellular modem, the first wireless network comprises a first 3G or 4G cellular network, and the second wireless network comprises a second 3G or 4G cellular network.

6. The wireless communication device of claim 3, wherein the information for the network coverage areas of the first wireless network and the second wireless network stored within the geo-fence polygon entries further comprises a reliability indicator indicating which wireless modem should connect to the first wireless network of the second wireless network when the wireless network is within the corresponding geo-fence polygon.

7. The wireless communication device of claim 1, wherein the wireless communication device further comprises a database configured to store the geo-fence polygon entries, wherein the database is accessible to the network switching application.

8. The wireless communication device of claim 7, wherein the geo-fence polygon entries in the database are periodically updated from an outside source.

9. The wireless communication device of claim 1, wherein the geo-fence polygon entries are received by the wireless modem and stored temporarily on the memory, wherein the memory is accessible by the network switching application.

10. The wireless communication device of claim 9, wherein the network switching application is further configured to determine the path of travel by the wireless communication device and can request the geo-fence polygon entries of the geo-fence polygons that correspond to the path of travel.

11. The wireless communication device of claim 1, wherein the networking switching application further utilizes location information of the wireless communication device with the information associated with the second wireless network coverage areas to manage the connections of the wireless modem.

12. The wireless communication device of claim 11, wherein the wireless communication device is configured to receive the location information from a GPS module.

13. The wireless communication device of claim 12, wherein the location information comprises location coordinates, heading, and speed of the wireless communication device.

14. The wireless communication device of claim 1, wherein the network switching application is further configured to create records of connection events of the wireless modem within the second wireless network coverage areas.

15. The wireless communication device of claim 14, wherein the network switching application is configured to prepare a record for the connect event, wherein the record comprises portions of the location information and signal information of the second wireless network in the second wireless network coverage area, wherein the signal information is supplied by the wireless modem.

16. The wireless communication device of claim 15, wherein the signal information comprises signal strength, signal quality, signal availability, and throughput of a signal from the second wireless network.

17. The wireless communication device of claim 15, wherein the network switching application is further configured to communicate the record to a central storage location.

18. The wireless communication device of claim 14, wherein the connect events comprises;
   a) a disconnect of the wireless modem from the second wireless network of one of the second wireless network coverage areas;
   b) a discovery of a second wireless network not associated with one of the second wireless network coverage areas; and
   c) a continued connection of the wireless modem to the second wireless network of one of the second wireless network coverage areas.

19. A method of automatically monitoring and controlling connections of a wireless modem of a wireless communication device between a first wireless network and a second wireless network, the method comprising the steps of:
   a. determining if the wireless modem is connected to the second wireless network;
   b. determining if the second wireless network is available if the wireless modem is not connected to the second wireless network based on stored information associated with network coverage area of the second wireless network by utilizing information associated with network coverage areas of the first wireless network and the second wireless network, wherein the information for the network coverage areas of the first wireless network and the second wireless network is stored within a geo-fence polygon entry, wherein each geo-fence polygon entry contains the information for portions of the network coverage areas found within a corresponding geo-fence polygon;
   c. directing the wireless modem to connect to the second wireless network if the second wireless network is available and the wireless modem is connected to the first wireless network; and
   d. directing the wireless modem to connect to the first wireless network if the second wireless network is not available.

20. The method of claim 19, wherein determining if the second wireless network is available comprises:
   e. determining the location of the wireless communication device;
   f. finding reliability data of the second wireless network corresponding to the location of the wireless communication device, wherein the geo-fence polygon entry corresponding to the location includes the reliability data, wherein directing the wireless modem to connect to the second wireless network further comprises:
      i) determining whether the reliability data of the second wireless network indicates that the second wireless network is reliable; and
      ii) ordering the wireless modem to connect to the second wireless network if the reliability data indicates the faster wireless network is reliable.

21. The method of claim 20, further comprising the step of:
   a. determining whether the second wireless network is reliable after ordering the wireless modem to connect to the second wireless network.

22. The method of claim 21, further comprising the step of:
   a. ordering the wireless modem to maintain the connection to the second wireless network if the second wireless network is reliable; or
   b. ordering the wireless modem to drop the connection to the second wireless network and connect to the first wireless network if the second wireless network is not reliable; and
   c. updating the reliability data of the second wireless network.

23. The method of claim 21, wherein determining whether the second wireless network is reliable by obtaining current reliability information from the second wireless network from the wireless modem and comparing the current reliability information to reliability thresholds.

24. The method of claim 19, wherein steps a through d are performed in a continuous loop.

25. The method of claim 19, wherein the step of determining whether the wireless modem is connected to the second wireless network further comprises determining if the second wireless network is reliable if the wireless modem is connected to the second wireless network.

26. The method of claim 25, further comprising the steps of:
   a. commanding the wireless modem to disconnect from the second wireless network;
   b. commanding the wireless modem to connect to the first wireless network; and
   c. updating the reliability data to indicate that the second wireless network is not reliable, wherein the steps are performed if the second wireless network is not reliable.

27. The method of claim 24, further comprising the steps of:
   a. checking the reliability data of the second wireless network;
   b. updating the reliability data of the second wireless network to show that the second wireless network is reliable if
      i. the second wireless network is shown to be reliable; and
      ii. the reliability data of the second wireless network indicates that the second wireless network is not reliable.

* * * * *